(12) United States Patent
Nagahara et al.

(10) Patent No.: US 7,077,182 B2
(45) Date of Patent: Jul. 18, 2006

(54) RUN-FLAT TIRE

(75) Inventors: Naoya Nagahara, Kobe (JP); Takayuki Shibata, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/073,698

(22) Filed: Mar. 8, 2005

(65) Prior Publication Data

US 2005/0211361 A1    Sep. 29, 2005

(30) Foreign Application Priority Data

Mar. 25, 2004  (JP)  ............................ 2004-089816

(51) Int. Cl.
  *B60C 17/00* (2006.01)
  *B60C 9/18* (2006.01)
  *B60C 15/00* (2006.01)

(52) U.S. Cl. .................. 152/517; 152/532; 152/554

(58) Field of Classification Search ............... 152/517, 152/532, 554
See application file for complete search history.

(56) References Cited

U.S. PATENT DOCUMENTS

| | | | |
|---|---|---|---|
| 4,142,567 A * | 3/1979 | Johannsen et al. ...... 152/517 X |
| 5,988,247 A | 11/1999 | Tanaka | |
| 6,026,878 A | 2/2000 | Zhang et al. | |
| 6,530,404 B1 * | 3/2003 | Rooney ................. 152/517 X |
| 2004/0055687 A1 * | 3/2004 | Whitney ................... 152/517 |

FOREIGN PATENT DOCUMENTS

| | | |
|---|---|---|
| EP | 0 911 188 A1 | 4/1999 |
| EP | 1 167 081 A1 | 1/2002 |
| EP | 1 400 374 A2 | 3/2004 |
| JP | 2000-351307 A | 12/2000 |

* cited by examiner

*Primary Examiner*—Adrienne C. Johnstone

(57) ABSTRACT

A run-flat tire comprises:
  a carcass comprising a carcass ply of cords extending between bead portions and turned up around a bead core in each bead portion from the inside to outside of the tire so as to form a pair of turnup portions and a main portion therebetween
  a belt disposed radially outside the carcass in the tread portion and
  a reinforcing rubber layer comprising
  a pair of side parts each provided between the main portion and the turnup portion and extending from the bead core to the proximity of axially outer edge of the belt, and
  a center part disposed between the carcass and the belt and connected to the side parts of both side.

8 Claims, 5 Drawing Sheets

RUN-FLAT TIRE

BACKGROUND OF THE INVENTION

1. Field of the Invention

The present invention relates to a run-flat tire improved in run-flat performance.

2. Description of the Prior Art

There are known run-flat tires capable of performing running for a relatively long distance even when the tire have been deflated due to a puncture or other factors. General run-flat tires are provided with sidewall reinforcing rubber layers at sidewall portions thereof that are formed of hard rubber for supporting load in the presence of a puncture.

FIG. 5 shows a sectional view of a conventional run-flat tire. A pair of sidewall reinforcing rubber layers "a" each have a substantially crescent shaped section and are disposed axially inside of the carcass b in the sidewall portion. Each sidewall reinforcing layer "a" includes an radially inner end p2 and an radially outer end p1.

However, a run-flat tire of such a structure is disadvantaged in that positions of the outer end p1 and the inner end p2 of the sidewall reinforcing rubber layers "a" are apt to vary widely when forming a green tire. For instance, when a part of the outer end p1 is located further inside than a tread grounding end Te in the tire axial direction, inputs from the road surface largely change within a single rotation of the tire. Accordingly, radial force variations (hereinafter referred to as "RFV") are worsened to thereby degrade uniformity of the tire. Further, in the presence of variations in positions of the inner end p2 of the sidewall reinforcing rubber layers "a", the longitudinal spring coefficient and the load supporting performance of the tire will be changed to lead to worsening of the RFV and worsening of run-flat performances.

SUMMARY OF THE INVENTION

It is a major object of the present invention to provide a run-flat tire capable of restricting worsening of uniformity and variations in run-flat performances.

According to the present invention, a run-flat tire comprises: a carcass comprising a carcass ply of cords extending between bead portions and turned up around a bead core in each bead portion from the inside to outside of the tire so as to form a pair of turnup portions and a main portion therebetween; a belt disposed radially outside the carcass in the tread portion; and a reinforcing rubber layer comprising a pair of side parts each provided between the main portion and the turnup portion and extending from the bead core to the proximity of axially outer edge of the belt, and a center part disposed between the carcass and the belt and connected to the side parts of both side.

Since the run-flat tire according to the present invention is arranged in the above-described manner, it is possible to restrict worsening of uniformity and variations in run-flat performances.

DESCRIPTION OF THE PREFERRED EMBODIMENTS

An embodiment of the present invention will now be described in detail in conjunction with the accompanying drawings.

Figure 1:
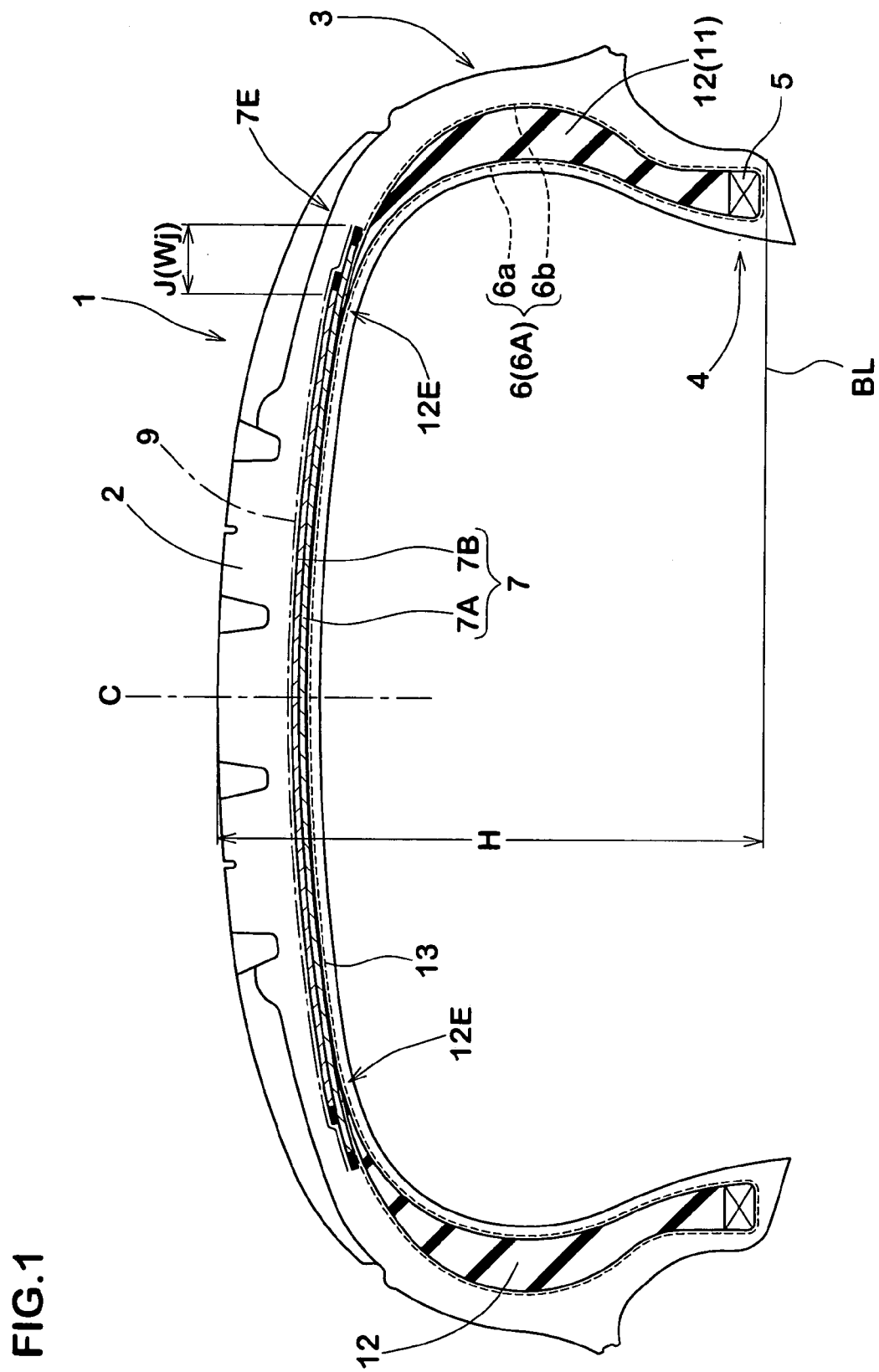
FIG. 1 is a sectional view showing one embodiment of a run-flat tire according to the present invention.

In FIG. 1, a run-flat tire 1 for a passenger car in accordance with the present invention comprises: a tread portion 2; a pair of side wall portions 3; a pair of bead portions 4 with a bead core 5 therein; a carcass 6 comprising at least one carcass pry 6A of cords which extends between the bead portions 4 through the tread portion 2 and sidewall portions 3; a belt 7 disposed radially outside the carcass in the tread portion 2; and a reinforcing rubber layer 11.

The belt 7 comprises at least two cross plies of rubberized parallel belt cords which are laid at an angle of from 10 to 35 degrees with respect to the tire equator C. In this example, the belt 7 is composed of a radially outer ply 7B and a radially inner ply 7A. For the belt cords, steel cords, and high modulus organic fiber such as aramid, rayon and the like can be used.

On the other hand, in order to further improve the high-speed durability of the belt 7, a band 9 which covers at least edge portions of the belt can be disposed radially outside the belt 7. Here, the band 9 is a cord layer made of at least one cord spirally wound, or parallel cords having an angle of from 0 to 5 degrees with respect to the circumferential direction of the tire. In this embodiment, the band 9 comprises a single band ply having an equal width substantially with the belt 7. For the band cords, organic fiber cords, e.g. nylon, rayon, aramid and the like may be used.

The carcass 6 is composed of at least one ply, in this example only one ply 6A of cords arranged radially at an angle of 70 to 90 degrees with respect to the tire equator C. For the carcass cords, organic fiber cords, e.g. nylon, polyester, rayon, aramid and the like and steel cords may be used.

The carcass ply 6A of cords extends between the bead portions 4 through the tread portion 2 and sidewall portions 3, and turned up around the bead cores 5 from the axially inside to the axially outside of the tire so as to form a pair of turnup portions 6b and a main portion 6a therebetween.

In this present embodiment, each turnup portions 6b of the carcass ply 6A extends through the sidewall portion 3 to the tread portion 2 and terminates between the belt 7 and the main portion 6a. With this arrangement, the bending rigidity is improved over a large area ranging from the bead portions 4 up to the sidewall portions 3. Since radially outer ends of the turnup portions 6b will not appear at the sidewall portions 3 that are apt to largely deflect when run-flat running, damages at the outer ends can be prevented.

In this respect, when an overlapping width Wj between the turnup portion 6b and the belt 7 in the tire axial direction is too small, such effects will not be exhibited while when it is too large, it will increase the tire weight and worsen the fuel efficiency. In this viewpoint, the overlapping width Wj is preferably in a range of from 5 to 50 mm, more preferably in a range of from 10 to 50 mm.

The reinforcing rubber layer 11 has a toroidal shape comprising: a pair of side parts 12 each provided between the main portion 6a and the turnup portion 6b and extending from the bead core 5 to the axially outer edge 7E of the belt 7; and a center part 13 disposed between the carcass 6 and the belt 7 and connected to the side parts 12 of both side. The reinforcing rubber layer 11 desirably has a JIS-A hardness of in a range of from 70 to 98 degrees. When the JIS-A hardness of the reinforcing rubber layer 11 is less than 70 degrees, the ability of supporting load in the presence of a puncture will fall short so that run-flat performances cannot be sufficiently exhibited. On the other hand, when the hardness exceeds 98 degrees, the riding comfort at the time of normal running, the fuel efficiency and the durability tend to be worsened. In this embodiment, the side parts 12 and the center port 13 are made of substantially same rubber.

Figure 2:
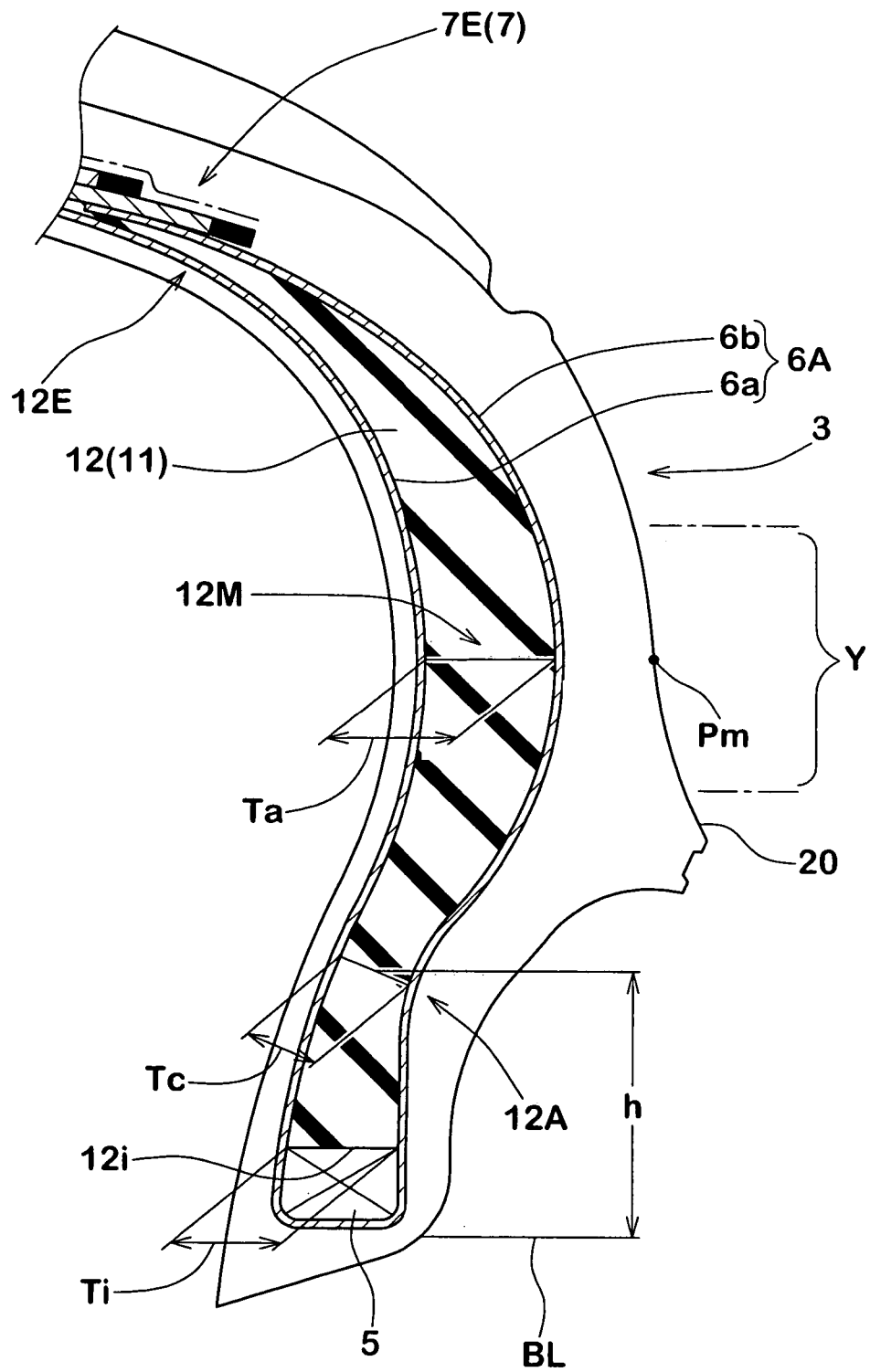
FIG. 2 is a sectional view showing a side part of a reinforcing rubber layer in enlarged form.

As shown in FIGS. 1 and 2, in this embodiment, each side part 12 has a maximum thickness portion 12M having a maximum thickness Ta at substantially a central position of the tire height H.

In order to improve the run-flat performance, a radial difference between the maximum thickness portion 12M and a tire maximum width position Pm is not more than 10% of the tire height H. In other words, the maximum thickness portion 12M is preferably positioned in a range Y of 20% of the tire height H with a tire maximum width position Pm being the center. With this arrangement, the side parts 12 can effectively support the load in the presence of a puncture.

Here, the term "tire maximum width position" indicates a position at which a line in the tire axial direction, which extends through a point at which the carcass 6 mostly projects outside in the tire axial direction, intersects with an outer surface of the sidewall portions 3 in a standard condition. The standard condition is a condition in which the tire is mounted on a standard rim and inflated to a standard pressure and loaded with no tire load. Further, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure.

The side parts 12 desirably have the maximum thickness Ta of in a range of from 5 to 30 mm. When the maximum thickness Ta is less than 5 mm, the ability of supporting load in the run-flat condition will fall short so that run-flat performances cannot be sufficiently exhibited. On the other hand, when the maximum thickness Ta exceeds 30 mm, the riding comfort at the time of normal running, the fuel efficiency and the durability tend to be worsened.

Further, the side part 12 has a radially inner end 12i and a constricted portion 12A having a thickness smaller than the inner end 12i. The constricted portion 12A is preferably provided between the inner end 12i and the maximum thickness portion 12M. That is, in this region, the thickness of the side part 12 gradually reduces from the inner end 12i towards the constricted portion 12A and then gradually increases from the constricted portion 12A to the maximum thickness portion 12M. By the provision of the constricted portions 12A, it is possible to achieve favorable riding comfort at the time of normal running when the air pressure is appropriate.

The constricted portion 12A desirably has a thickness Tc corresponding to 50 to 95% of the thickness Ti of the inner end 12i. Further, the constricted portion 12A are favorably provided at a height h corresponding to 10 to 30% of the tire height H. However, the side part 12 may alternatively extend to the maximum thickness portion 12M with the thickness being constant from the inner end 12i or with the thickness being gradually increased. Further, the side part 12 extends from the maximum thickness portion 12M to the outer ends 12E thereof with the thickness being gradually reduced.

Figure 3:
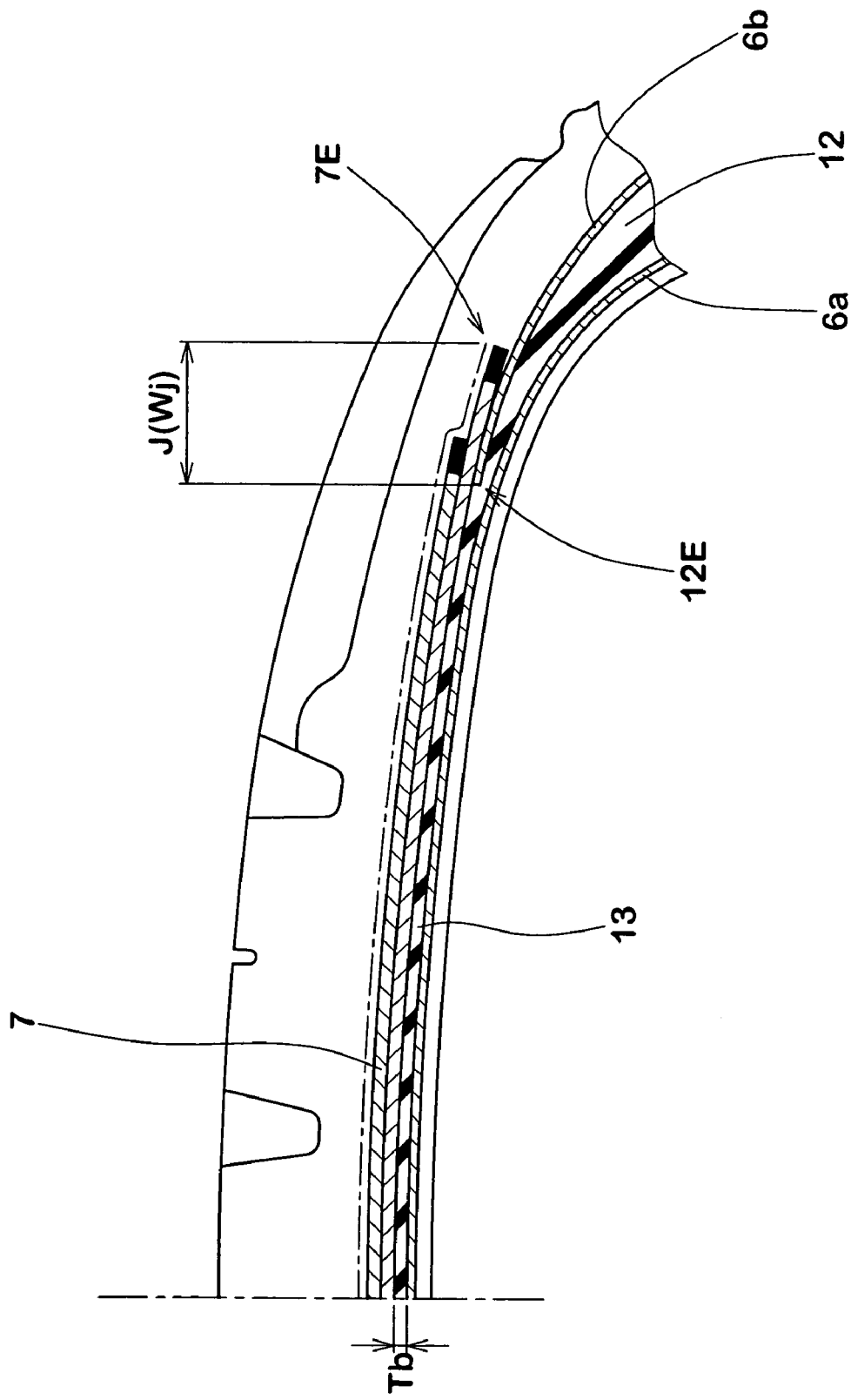
FIG. 3 is a sectional view showing a center part of the reinforcing rubber layer in enlarged form.

As shown in FIG. 3, the center part 13 is sheet-like having a small thickness Tb and is disposed between the carcass 6 and the belt 7 for connecting the side parts 12, 12 on both sides. With this arrangement, the reinforcing rubber layer 11 assumes a toroidal shape.

Figure 5:
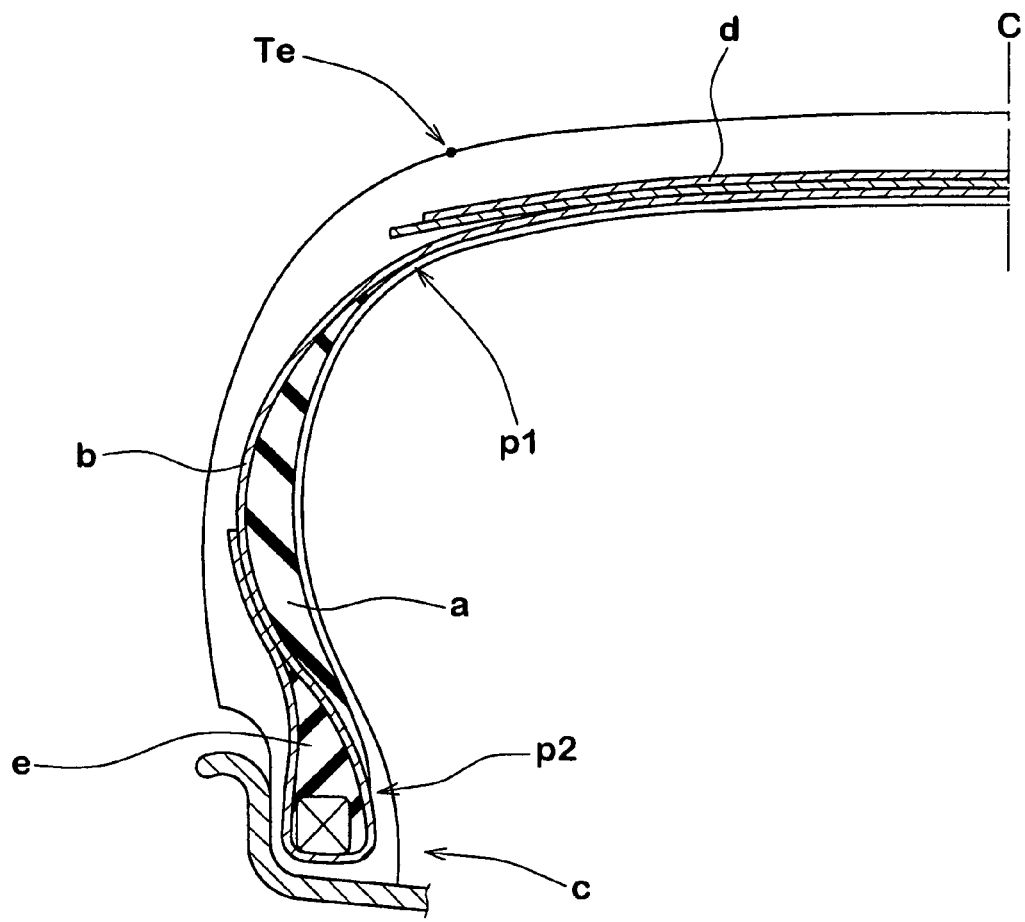
FIG. 5 is a sectional view showing a conventional run-flat tire.

Since the reinforcing rubber layer 11 is arranged, it is possible to secure uniformity at the time of molding. For instance, no relative positional shift is generated between the conventional bead apex "e" (as shown in FIG. 5) and the sidewall reinforcing rubber layers "a" in the course of molding a green tire. It is accordingly possible to uniformize the longitudinal spring coefficient of the tire and the load supporting performance. Moreover, in the reinforcing rubber layer 11, since the outer ends 12E of the side parts 12 are integrated through the center part 13, it is possible to restrict positional shifts of the outer ends p1 of the sidewall reinforcing rubber layers "a" as in the prior art. It is accordingly possible to improve uniformity of the tire and particularly the RFV. Further, since all the surfaces of the reinforcing rubber layer 11 are covered with code plies including the carcass ply 6A and the belt 7, the reinforcing rubber layer 11 has a high reinforcement effect.

Figure 4:
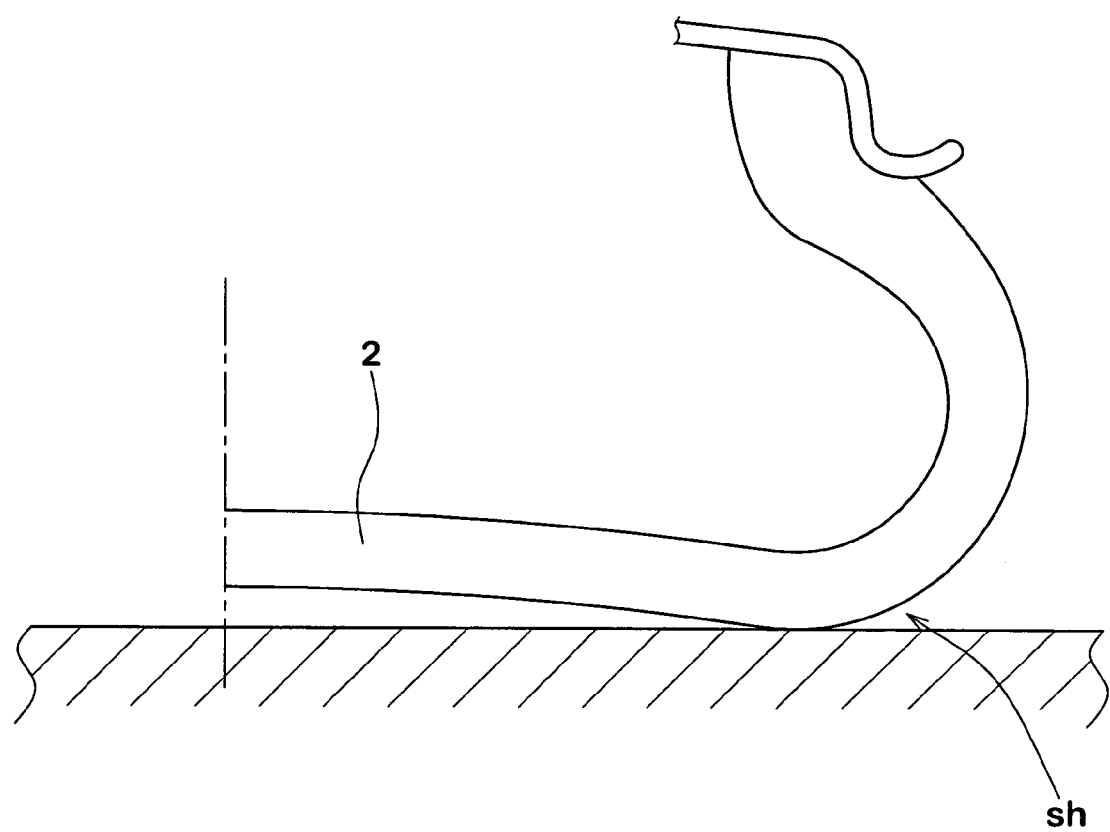
FIG. 4 is a diagram for explaining one action and effect of the present invention.

When performing run-flat running with the run-flat tire, buckling deformation of the tread portion 2 occurs as shown in FIG. 4. Such a deformation increases the distortion of a shoulder portion Sh so that the durability is degraded. Conventionally, the rubber volume of the sidewall reinforcing layers "a" was increased for dispersing the distortion at the shoulder portion Sh so as to reduce the amount of flexion deformity at the sidewall portions 3.

However, in the reinforcing rubber layer 11 of the present embodiment, the above-described buckling deformation can be restricted since the center part 13 reinforces the tread portion 2. It is accordingly possible to reduce the thickness of the side parts 12 and to realize weight saving while maintaining or improving the durability at the time of run-flat running. In view of this fact, the center part 13 desirably has the thickness Tb of not less than 0.5 mm at minimum, and more preferably of not less than 1.0 mm. While no upper limit is particularly defined, it is favorably not more than 2.0 mm since a thickness Tb that is too large harms the riding comfort and leads to unnecessary increases in tire weight.

While a particularly preferred embodiment of the present invention has been described in details, the present invention is not limited to the illustrated embodiment but may be embodied upon modifying the same into various forms.

(Comparison Test)

Run-flat tires (size 245/40ZR18) having a basic structure of FIG. 1 and based on specifications of Table 1 were manufactured on trial and respective tire weights, uniformity, run-flat performance and riding comfort were evaluated. Specifications other than parameters as listed in Table 1 were substantially common to all. In this respect, Comparative Example 1 was arranged such that a cord ply in which reinforcing cords are spirally wound was disposed at a crown region of the tread portion of a conventional tire and between the carcass and the belt instead of the center part 13.

The test methods were as follows.

Tire Weight:

Weights of single tires were indicated as indices with that of Prior Art Example being 100. The smaller the value is, the lighter the tire is.

Uniformity:

Primary RFVs were measured by using a uniformity tester. Conditions for the rim was 18×8.5JJ, the internal pressure 200 kPa and the load 4.88 kN. The smaller the value is, the more favorable it is.

Riding Comfort:

Tires were mounted to a vehicle (3,000 cc, FR vehicle) under conditions for the rim being 18×8.5JJ and the internal pressure 230 kPa, and the riding comfort when running on a tire test course (dry pavement) was evaluated through senses of a driver. The results were indicated by a 10-point method with the point of Prior Art Example being 6. The larger the value is, the more favorable it is.

Run-flat Performances:

The vehicle was made to run on the tire test course at a velocity of 90 km/h in a state that the bulb core of only the tire of the left rear wheel is eliminated and the internal pressure is zero, and running distances until the tires burst were measured. The results are indicated as indices with that of Prior Art Example being 100. The larger the value is, the more favorable it is.

Test results are illustrated in Table 1.

TABLE 1

|  | Prior Art Example | Comparative Example 1 | Example 1 | Example 2 | Example 3 | Example 4 | Example 5 | Example 6 |
|---|---|---|---|---|---|---|---|---|
| Reinforcing rubber layer |  |  |  |  |  |  |  |  |
| Structure | FIG. 5 | FIG. 5 | FIG. 1 | FIG. 1 | FIG. 1 | FIG. 1 | FIG. 1 | FIG. 1 |
| Rubber hardness <degrees> (*1) | 86:92 | 86:92 | 92 | 92 | 92 | 92 | 92 | 92 |
| Center part provided? | NO | NO (cord plies) | YES | YES | YES | YES | YES | YES |
| Thickness Tb of center part <mm> | — | — | 0.1 | 0.5 | 1.0 | 1.5 | 2.0 | 2.5 |
| Maximum thickness Ta of side part (*2) | 100 | 100 | 100 | 90 | 90 | 90 | 90 | 90 |
| Tire weight | 100 | 105 | 93 | 94 | 95 | 96 | 97 | 98 |
| Primary RFV <N> | 60 | 60 | 50 | 50 | 50 | 52 | 53 | 55 |
| Run-flat performance | 100 | 110 | 120 | 115 | 115 | 115 | 110 | 110 |
| Riding comfort | 6 | 6 | 4.5 | 5.5 | 5.5 | 5.5 | 5 | 4.5 |

*1) In Prior Art Example and Comparative Example, respective rubber hardnesses (bead apex rubber: sidewall reinforcing rubber layer) are indicated.
*2) In Prior Art Example and Comparative Example, the maximum thickness Ta of the sidewall reinforcing rubber layers were measured and indicated as indices with the maximum thickness Ta of Prior Art Example being 100.

It was found through the tests that improvements in uniformity, weight saving and improvements in run-flat performances were achieved with the present examples when compared to Prior Art Example.

What is claimed is:

1. A run-flat tire comprising:
    a carcass comprising a carcass ply of cords extending between bead portions and turned up around a bead core in each bead portion from the inside to outside of the tire so as to form a pair of turnup portions and a main portion therebetween;
    a belt disposed radially outside the carcass in the tread portion; and
    a reinforcing rubber layer comprising
    a pair of side parts each provided between the main portion and the turnup portion and extending from the bead core to the proximity of axially outer edge of the belt, and
    a center part disposed between the carcass and the belt and connected to the side parts of both side.

2. A run-flat tire according to claim 1, wherein
    each said side part has a maximum thickness portion having a maximum thickness, and
    a radial difference between the maximum thickness portion and a maximum width position of the tire is not more than 10% of the tire height H.

3. A run-flat tire according to claim 2, wherein
    each said side part has a radially inner end and a constricted portion having a thickness smaller than the inner end, and
    the constricted portion is provided between the inner end and the maximum thickness portion.

4. A run-flat tire according to claim 3, wherein
    the thickness of the constricted portion is in a range of from 50 to 95% of the thickness of the inner end.

5. A run-flat tire according to claim 1, wherein
    the reinforcing rubber layer has a maximum thickness Ta in a range of from 5 to 30 mm.

6. A run-flat tire according to claim 1, wherein
    said center part has a thickness Tb of at least 0.5 mm.

7. A run-flat tire according to claim 1, wherein
    the reinforcing rubber layer has a JIS-A hardness of in a range of from 70 to 98 degrees.

8. A run-flat tire according to claim 1 or 6, wherein
    the thickness of the center part is not more than 2.0 mm.

* * * * *